United States Patent

Worthington

[19]

[11] Patent Number: 4,875,497
[45] Date of Patent: Oct. 24, 1989

[54] CAPACITANCE LIQUID LEVEL SENSING AND TOUCH CONTROL SYSTEM

[76] Inventor: Ralph T. Worthington, 4733 Mt. St. Helens Ct., San Diego, Calif. 92117

[21] Appl. No.: 602,763

[22] Filed: Apr. 23, 1984

[51] Int. Cl.⁴ .................... G01F 23/26; F16K 31/02
[52] U.S. Cl. ............................ 137/2; 73/304 C;
  137/392; 324/60 C; 324/60 CD; 324/61 P;
  340/620; 361/284; 417/36
[58] Field of Search ............ 73/304 C; 137/392;
  340/620; 417/36, 44; 307/118; 361/178, 284;
  324/60 C, 60 CD, 61 P, 65 P

[56] References Cited

U.S. PATENT DOCUMENTS

| | | | |
|---|---|---|---|
| 3,042,908 | 7/1962 | Pearson | 73/304 C |
| 3,119,267 | 1/1964 | Bartky | 73/304 C |
| 3,135,916 | 6/1964 | Tannenbaum et al. | 73/304 C |
| 3,375,716 | 4/1968 | Hersch | 73/304 C |
| 3,644,885 | 2/1972 | Radin | 340/620 |
| 3,863,147 | 1/1975 | Erath | 73/304 C |
| 3,916,213 | 10/1975 | Luteran | 137/392 |
| 4,001,676 | 1/1977 | Hile et al. | 73/304 C |
| 4,083,248 | 4/1978 | Maier | 73/304 C |
| 4,145,927 | 3/1979 | Larson | 73/304 C |
| 4,149,412 | 4/1979 | Fish | 73/304 C |
| 4,165,509 | 8/1979 | Betts et al. | 340/620 |
| 4,171,932 | 10/1979 | Miller | 417/36 |
| 4,199,984 | 4/1980 | Huddart et al. | 73/304 C |
| 4,205,237 | 5/1980 | Miller | 340/620 |
| 4,258,444 | 3/1981 | Orszullok | 73/304 C |
| 4,259,865 | 4/1981 | Myers | 73/304 C |
| 4,347,740 | 9/1982 | Townsend | 73/304 C |
| 4,450,501 | 5/1984 | Kobayashi | 73/304 C |
| 4,515,015 | 5/1985 | Kuhlman | 73/304 C |
| 4,530,372 | 7/1985 | Overton et al. | 137/392 |
| 4,583,402 | 4/1986 | Myers et al. | 73/304 C |

*Primary Examiner*—George L. Walton
*Attorney, Agent, or Firm*—Frank D. Gilliam

[57] ABSTRACT

A capacitance liquid level or volume sensing and touch control system for use with a conductive liquid having some isolation from and a capacitance to ground in accordance with its volume, is characterized by a circuit for cyclically charging the liquid a predetermined amount and then discharging it for a fixed time through an impedance. The extent of discharge of the liquid at the end of the fixed time is sensed, and is used to generate a signal representative of the volume of the liquid and its level. The system also has a capacitance touch control circuit, which generates an output signal when a sensor probe is touched or closely approached by a user. The signals from the capacitance liquid level sensing circuit and the touch control circuit are applied to a discriminator circuit which, when a signal representative of a sensed minimum volume of liquid is present, enables outputs from the touch control circuit to operate peripheral equipment, such as a pump for recirculating the liquid. Preferably, a slow reacting feedback circuit maintains the sensitivity of the touch control circuit substantially constant despite relatively slow changes in the capacitance exhibited by the sensor probe due to naturally occurring conditions.

33 Claims, 1 Drawing Sheet

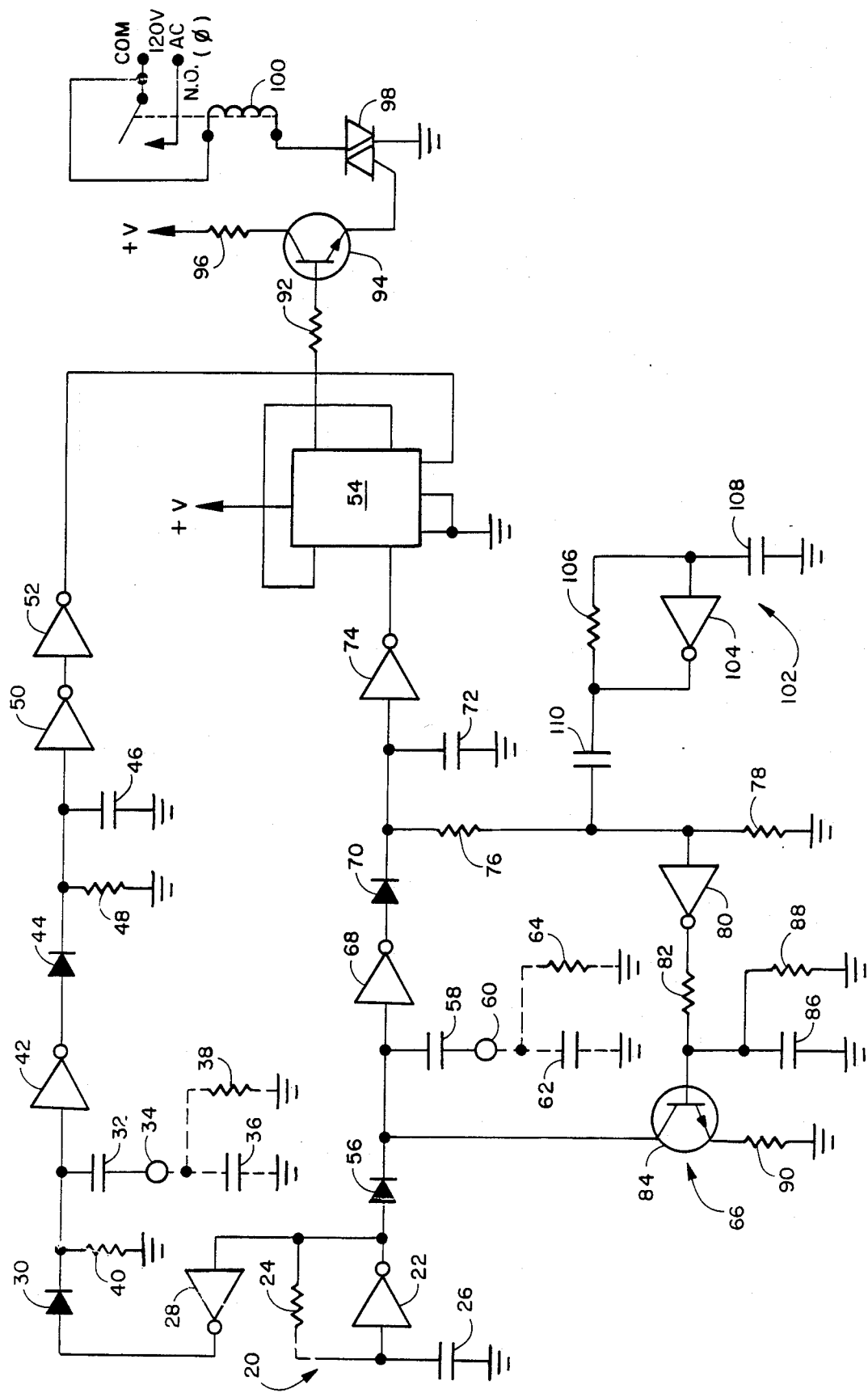

CAPACITANCE LIQUID LEVEL SENSING AND TOUCH CONTROL SYSTEM

BACKGROUND OF THE INVENTION

The present invention relates to a capacitance liquid level or volume sensing circuit, in combination with a capacitance touch control circuit which may be used to actuate peripheral equipment only in response to the sensing of a minimum liquid level or volume.

Various liquid level or volume sensing systems are known. Some are primarily mechanical in nature, and generally utilize a float which moves up and down on the surface of liquid in a vessel as the level and volume of the liquid change. The float may be mechanically connected with a gauge for providing a visual indication of the level of liquid, or with a valve for the liquid to maintain a selected level of liquid in the vessel.

In another type of liquid level sensor adapted for use where a reading of the liquid level is to be generated at a location remote from the liquid, a float which follows the level of liquid is moved along a potentiometer. The potentiometer generates a signal in accordance with the position of the float, and the signal is carried over conductors to the remote location, whereat it is used to provide an indication of the liquid level Because of the mechanical elements involved, the above types of sensors are prone to breakage and wear, resulting in inaccurate liquid level indications and necessitating replacement of the sensors. Also, since the readings depend upon movement of mechanical elements, it is difficult to calibrate the sensors and inaccuracies often result.

One use for liquid level sensors not heretofore generally recognized is with water jetted bathtubs and spas, which are gaining increasing popularity. In order that a pump for recirculating the water not be destroyed if insufficient water is in the bathtub or spa, operation of the pump should be inhibited unless there is at least a minimum level of water. However, that requires use of a liquid level sensor, and conventional mechanical sensors are ill suited for the purpose, since not only would they be subject to breakage upon contact by users, but they would also present a physical hazard upon contact.

In addition to not operating the pump in the absence of a sufficient level of water, to conserve energy, water should be recirculated only when the bathtub or spa is being used and, for convenience, the user should be able to control operation of the pump while he is in the spa or bathtub. Although a simple switch for the pump could be used, because of the high voltages normally present and the fact that the user would be immersed in water and likely operate the switch with a wet hand, the technique would be inherently hazardous and possible fatal.

As an alternative to a conventional switch, a capacitance switch including a touch plate or sensor, operated at a very low voltage and current, could be used. However, such capacitance switches as are presently available are unstable, unreliable and require on-site manual sensitivity adjustment to properly respond only to the change in capacitance that occurs when the sensor is touched. Systems requiring critical manual adjustment generally cannot compensate for changing conditions and drift caused by naturally occurring environmental conditions, particularly those which would occur in the inherently wet environment of a bathtub or spa, and therefore can be reliably used only in controlled environments.

OBJECTS OF THE INVENTION

An object of the present invention is to provide a capacitance liquid level or volume sensing system, which provides an indication of liquid level or volume as a function of the capacitance to ground exhibited by the liquid.

Another object is to provide such a system, wherein a capacitance sensing probe may be either immersed in or spaced above the liquid.

A further object is to provide an improved capacitance touch control system, which generates an output signal in response to a probe being closely approached or touched by a user, wherein the touch control system is self-compensating to have a generally constant sensitivity and has a broad range of practical applications.

Yet another object is to provide a combination of the capacitance liquid level or volume sensing system and the capacitance touch control system, wherein the touch control system is enabled to actuate peripheral equipment only in response to a sensed liquid level being at least equal to a selected level.

A still further object is to provide such a combination which is compact, has minimum numbers of circuit components and can be located in a position convenient to a user.

SUMMARY OF THE INVENTION

In accordance with the present invention, a system for sensing the volume of a conductive liquid having some isolation from ground and a capacitance to ground in accordance with its volume, comprises first circuit means for cyclically charging the liquid a predetermined amount and then discharging the liquid for a substantially fixed period of time through an impedance. The liquid is discharged by an amount in accordance with its capacitance to ground, and therefore in accordance with its volume, and second circuit means is provided for sensing the amount of discharge of the liquid and for generating a signal having a value representative thereof, and therefore representative of the volume of the liquid.

In a contemplated embodiment, the liquid is in a vessel, its volume is sensed, and only when it has at least a selected volume may a pump be energized to recirculate the liquid. To that end, said second circuit means signal has at least a selected value when the liquid has at least the selected volume, and also included is manually responsive switch means for generating an output signal, and discriminator circuit means for receiving said second circuit means and said switch means signals and for generating a control signal to alternately energize and deenergize the pump in response to successive occurrences of said switch means signal while said second circuit means signal has at least said selected value. Advantageously, said switch means comprises a conductive probe, means for sensing a change in capacitance exhibited by said probe upon said probe being closely approached or touched by a user, and means, responsive to sensing at least a selected change in capacitance, for generating said switch means signal.

The invention also provides a method of sensing the volume of a conductive liquid having some isolation from ground and a capacitance to ground in accordance with its volume, which comprises cyclically charging the liquid a predetermined amount and then discharging the liquid for a substantially fixed period of time through an impedance. The liquid is discharged by an amount in accordance with its capacitance to ground, and therefore in accordance with its volume, and the amount of discharge of the liquid is sensed and a signal is generated which has a value representative thereof, and therefore representative of the volume of the liquid.

In a contemplated embodiment of the method, the liquid is in a vessel, its volume is sensed, and only when it has at least a selected volume may a pump be energized to recirculate the liquid. To that end, said generating step comprises generating a control signal having at least a selected value when the liquid has at least a selected volume, and the method further includes the steps of generating a switching signal, and detecting successive occurrences of the switching signal while said control signal has at least the selected value and alternately energizing and deenergizing the pump in response thereto. Said step of generating a switching signal advantageously comprises sensing a change in capacitance exhibited by a conductive probe when the probe is closely approached or touched by a user, and generating said switching signal in response to sensing at least a selected change in capacitance exhibited by the probe.

The foregoing and other objects, advantages and features of the invention will become apparent upon a consideration of the following detailed description, when taken in conjunction with the accompanying drawings.

BRIEF DESCRIPTION OF THE DRAWING

The single drawing figure is a schematic representation of a capacitance liquid level sensing circuit and a capacitance touch sensor circuit, which embody the teachings of the invention.

DETAILED DESCRIPTION

The drawing illustrates a capacitance liquid level or volume sensing circuit and a capacitance touch sensor circuit as contemplated by the invention. The liquid level or volume sensing circuit is adapted to sense the level or volume of a conductive liquid contained in a vessel, such as water in a bathtub or spa, by means of sensing the capacitance to ground of the water. The function of the circuit is based on the premise that increases and decreases in the volume of the water increase and decrease its capacitance to ground, and the capacitance is sensed and a signal is generated which has a value representative of the capacitance and therefore of the volume of water.

The touch sensor or touch control circuit couples to a conductive plate or probe adapted to be touched or closely approached by an individual. The capacitance of the plate is monitored, and when it increases at a rate sufficiently rapid to indicate that it has been closely approached or touched, an output signal is generated.

The signals from the water level sensing and touch control circuits are applied to a discriminator circuit which controls operation of peripheral equipment, such as a pump for recirculating the water. The presence of an output signal from the water level sensing circuit, having a value representative of at least a selected volume of water, enables the discriminator circuit to alternately energize and deenergize the pump in response to occurrence of successive signals from the touch control circuit, while in the absence of an appropriate signal from the water level circuit, the discriminator circuit is disabled from responding to outputs from the touch control circuit. Consequently, unless sufficient water is in the tub or spa, the pump cannot be operated, which affords protection against destructive operation of the pump should there be insufficient water. Also, because the touch control circuit applies only a very low voltage and current to the probe, the probe may be placed immediately alongside the tub or spa and touched by a user without danger of electrical shock.

More particularly, the water level or volume sensing circuit includes a multivibrator, indicated generally at 20, which comprises a Schmitt trigger 22, a resistor 24 and a capacitor 26. The output from the multivibrator is a square wave, and is coupled through a buffer gate 28, a diode 30 and a relatively large value coupling capacitor 32 with a terminal 34 to which a water sensing probe (not shown), such as a conductive plate, is connected. The probe is capacitively coupled with water in a vessel, for example in a bathtub or spa, for sensing the level or volume thereof, and the water may be represented by a load capacitance 36, which is the capacitance of the water to ground, together with an inherent impedance 38, if any, of the water to ground. As mentioned, the circuit senses the capacitance of the water to ground to monitor its level or volume, and to that end the probe may be: (a) normally immersed within the water in contact therewith, so that the capacitance at the terminal 34 is in accordance with the volume of water; (b) at a fixed position above the surface of the water, so that the capacitance at the terminal 34 varies as a function of the spacing between the probe and water surface; or (c) on a side wall of the vessel in a plane generally perpendicular to the surface of the water, so that the capacitance at the terminal increases rapidly upon the water rising to and contacting the probe. On the other hand, if the liquid is nonconductive and has a dielectric constant different from that of air, the probe may comprise a pair of spaced apart conductive plates, positioned so that the liquid occupies a volume within the gap between the plates which varies in accordance with the liquid level or volume to change the dielectric constant therebetween.

The negative portions of the output cycles from the multivibrator 20, as inverted by the buffer gate 28, charge the load capacitance 36 through the diode 30 and coupling capacitor 32, with the diode preventing discharge of the load capacitance through the buffer gate during positive half cycles of the multivibrator, and the coupling capacitor protecting the circuitry against damage should a high voltage be applied to the load. During the substantially constant or fixed time periods of the positive half cycles of the multivibrator, the load capacitance discharges through its inherent impedance 38, if any, to ground, as well as through an impedance 40 connected between ground and an input to a threshhold circuit or Schmitt trigger 42. The voltage to which the load discharges during each positive half cycle depends upon its capacitance and therefore the volume of the water, with an increase in volume and capacitance resulting in a lesser decrease in the voltage, and a decrease in volume and capacitance resulting in a greater decrease in the voltage. Whenever and for as long as the voltage discharges to a point where it falls below or penetrates the trip threshhold of the Schmitt trigger, a positive voltage pulse is generated at the output from the Schmitt trigger and applied through a diode 44 across a capacitor 46 in parallel with a resistor 48, to generate across the capacitor a d.c. voltage having a value in accordance with the duration or average value of the positive voltage pulses. In other words, the magnitude of the voltage across the capacitor is in accordance with and representative of the time for which, and therefore of the amount by which, the voltage of the load during discharge penetrates the threshhold level of the Schmitt trigger, and is therefore in accordance with and representative of the capacitance exhibited by the load.

It is contemplated that the value of the voltage across the capacitor 46 by used to provide an indication of the absolute volume or level of water in the vessel. However, it is also contemplated that peripheral or external equipment (not shown), such as a pump for recirculating the water, be prevented from operating in the absence of at least a selected minimum volume or level of the water, and to that end the voltage across the capacitor is applied through a pair of Schmitt triggers 50 and 52 to an enable/reset input to a discriminator circuit or flip-flop 54, the output from which is used to control the pump. The values of the components are selected so that, when the water has less than a selected volume or level, its capacitance 36 is sufficiently low that the voltage across the capacitor 46 remains above the trip threshhold of the Schmitt trigger 50, causing a positive "reset" signal to be applied to the enable/reset input to the flip-flop. However, when the water has at least the selected volume, its capacitance is then sufficient to cause the voltage across the capacitor to fall below or penetrates the trip threshhold of the Schmitt trigger 50, whereupon a negative "enable" signal is applied to the enable/reset input to the flip-flop, so that the flip-flop may then respond to signals at a clock input to control operation of the pump, as will be described.

The capacitance touch sensor or touch control circuit portion includes the multivibrator 20, the output from which is coupled through a diode 56 and a relatively large value coupling capacitor 58 with a terminal 60 to which a probe or conductive plate is connected. The probe has some isolation from ground, and may be represented by a load capacitance 62 and an inherent impedance 64, if any, to ground.

The positive portion of each multivibrator output cycle charges the load capacitance 62 to a predetermined voltage and then, during the negative portion of each cycle, which is blocked from the load capacitance by the diode 56, the load discharges via its inherent impedance 64, if any, as well as through a controlled rate discharge circuit, indicated generally at 66. The voltage charge on the load is coupled with an input to a threshhold detector circuit or Schmitt trigger 68, and whenever the voltage penetrates or falls below the threshhold level of the Schmitt trigger, a positive voltage signal or pulse in generated at an output from the Schmitt trigger for the duration of threshhold penetration. Under quiescent conditions, threshhold penetration occurs prior to the end of the negative portion of each multivibrator output cycle, and the resultant positive pulses are applied through a diode 70 to generate across a capacitor 72 a d.c. voltage having a level representative of the presence and duration of the pulses, and therefore of the amount of penetration of the threshhold level and the capacitance exhibited by the load or probe. The d.c. voltage is applied as an input to a Schmitt trigger 74, as well as across a pair of series connected resistors 76 and 78, the juncture of which is coupled with a feedback circuit portion of the controlled rate discharge circuit 66 to time delay control the discharge rate of the load capacitance to a substantially constant value.

The controlled rate discharge circuit 66 comprises a Schmitt trigger 80 having its input coupled to the juncture of the resistors 76 and 78 and its output connected through a resistor 82 to the base of an NPN transistor 84, and a capacitor 86 and a resistor 88 are connected between the transistor base and ground. The emitter of the transistor connects to ground through a resistor 90, the collector is connected to the input to the Schmitt trigger 68, and the transistor and resistor 90 establish the constant rate discharge path for the load capacitance 62.

Under quiescent conditions, the load capacitance 62 discharges during each negative half cycle of the multivibrator 20 to a voltage which penetrates the trip threshhold of the Schmitt trigger 68, causing positive pulses at the output therefrom. The positive pulses generate a d.c. voltage across the capacitor 72 which is above the trip threshhold of the Schmitt trigger 74, so that the output from ths Schmitt trigger, as applied to a clock input to the flip-flop 54, is negative.

Should a user of the bathtub or spa touch the probe 62, the increased capacitance exhibited by the probe and at the terminal 60, as a result of the capacitance of the user, is sufficient to prevent the voltage of the probe during discharge from falling below the threshhold level of the Schmitt trigger 68, so that positive pulses are not then generated by the Schmitt trigger. In consequence, the voltage across the capacitor 72 falls to below the threshhold level of the Schmitt trigger 74, and the resulting positive voltage pulse at the output from the Schmitt trigger is applied to the clock input to the flip-flop 54. If at this time the water in the spa has a sufficient volume or level so that a low "enable" voltage exists at the enable/reset input to the flip-flop, the flip-flop changes states and applies a positive voltage from its output through a resistor 92 to the base of an NPN transistor 94 to render the transistor conductive. The collector of the transistor connects through a resistor 96 with positive voltage, and the emitter to a gate input to a triac 98, so that when the transistor conducts the triac is triggered into conduction. The triac is in series with a relay 100 having a contact K1 for energizing the pump, whereby conduction of the triac turns on the pump. However, if at the time the user touches the probe there is insufficient water in the spa, a positive "reset" voltage will exist at the enable/reset input to the flip-flop, and an output will not be provided therefrom to trigger the triac.

When the user removes his hand from the probe, the capacitance of the probe decreases and a positive d.c. voltage is again generated across the capacitor 72, which causes the output from the Schmitt trigger 74 to become negative. A negative going transition at the clock input to the flip-flop does not change its output state, and the pump remains on. However, should the user again touch the probe, the resultant positive pulse at the clock input returns the flip-flop to its original state and renders the transistor 94 nonconductive, so that upon the next zero crossing of the a.c. line voltage the triac becomes nonconductive to deenergize the relay 100 and thereby the pump. It is to be understood that, irrespective of any action by the user, should the volume of water in the spa at anytime become insufficient for proper operation of the pump, the resulting positive voltage at the enable/reset input to the flip-flop will automatically reset the flip-flop to turn off the pump.

The controlled rate discharge circuit 66 maintains a substantially constant sensitivity of the touch controlled circuit despite slow changes in capacitance exhibited by the probe, as may occur due to naturally occurring environmental conditions. To that end, the values of the resistors 76 and 78, across which the voltage on the capacitor 72 is applied, are selected so that the voltage at the input to the Schmitt trigger 80 is at or near the center of its trip threshhold when the voltage across the capacitor is at a quiescent or circuit equilibrium level. Any increase or decrease in the voltage across the capacitor causes the output from the Schmitt trigger to switch in the opposite direction, which adjusts the voltage across the capacitor 86, and therefore the conductivity of the transistor 84, in a manner to slowly bring the load discharge rate to a rate which maintains circuit balance. In other words, feedback circuit means comprising the Schmitt trigger, and the components between it and the transistor 84, compensates for slow changes in the capacitance exhibited by the probe, so that the voltage to which the load is discharged and circuit sensitivity are maintained substantially constant under quiescent conditions, thereby preventing the occurrence of "false" signals from being applied to the clock input to the flip-flop 54. However, since the rate of adjustment of the feedback circuit means is slow, relatively rapid changes in capacitance exhibited by the probe, such as when it is touched by a user, result in a sufficient change in voltage across the capacitor 40 to provide a positive pulse from the output of the Schmitt trigger 74.

As a result of the inherent hysteresis between the switching levels of the Schmitt trigger 80, added stability is provided by a dither circuit, indicated generally at 102. The dither circuit comprises a multivibrator, which includes a Schmitt trigger 104, a resistor 106 and a capacitor 108, and generates a low frequency square wave output which is differentiated across a capacitor 110 connected in series between the multivibrator output and the input to the Schmitt trigger 80. The dither signal causes the output from the Schmitt trigger 80 to switch back and forth between its states, and is of such a rate that the output is relatively smoothly filtered by the capacitor 86 and resistor 88, whereby the output caused by the dither signal essentially nulls out across the capacitor. However, should a change in voltage level occur across the capacitor 72, the resulting voltage change at the juncture of the resistors 76 and 78 takes priority over the dither signal in controlling conduction of the Schmitt trigger 80, and therefore in controlling the feedback signal applied to the transistor 84.

The invention thus provides, in its use as specifically described, an improved means for controlling recirculation of water by a pump in a bathtub or spa. Because of the extremely low voltages and currents applied to the water and probe, there is no exposure of the user to a shock hazard, and the user may readily control recirculation of the water to suit his particular needs, At the same time, the water level or volume sensing portion of the circuit ensures that the pump cannot be operated under the condition when insufficient water is available and damage to the pump could result.

While embodiments of the invention have been described in detail, various modifications and other embodiments thereof may be devised by one skilled in the art without departing from the spirit and scope of the invention, as defined in the appended claims.

What is claimed is:

1. A system for sensing the volume of a conductive liquid having some isolation from ground and a capacitance to ground in accordance with its volume, comprising first circuit means for cyclically charging the liquid a predetermined amount and then discharging the liquid for a substantially fixed period of time through an impedance, the liquid being discharged by an amount in accordance with its capacitance to ground; and second circuit means for sensing the amount of discharge of the liquid and for generating an indicator signal having a value in accordance therewith, and therefore in accordance with the volume of the liquid.

2. a system as in claim 1, wherein said first circuit means cyclically charges the liquid to a predetermined voltage and then discharges the liquid for said substantially fixed period of time through said impedance, and said second circuit means senses the voltage to which the liquid is discharged and generates said indicator signal in response thereto.

3. A system as in claim 2, wherein said second circuit means comprises a voltage threshhold detector for sensing the voltage of the liquid and for generating a voltage signal at an output therefrom whenever and while the liquid is discharged to below a threshhold voltage, the extent of voltage discharge being inversely related to the magnitude of the capacitance of the liquid to ground, and third circuit means coupled with said voltage threshhold detector output for generating said indicator signal, said indicator signal having a value in accordance with the presence and duration of said threshhold detector voltage signals and therefore in accordance with the capacitance exhibited by and the volume of the liquid.

4. A system as in claim 1, including third circuit means coupled with said second circuit means and responsive to said indicator signal having a value representative of at least a selected minimum volume of liquid to generate an output signal.

5. A system as in claim 1, wherein the liquid is in a vessel, and including a conductive probe in fixed position above the surface of the liquid and capacitively coupled with the liquid, said first circuit means charging and discharging the liquid by charging and discharging said probe, and said second circuit means being coupled with said probe to sense the extent to which the probe, and therefore the liquid, is discharged, and generating said indicator signal in accordance therewith.

6. A system as in claim 5, wherein said indicator signal has at least a predetermined value when the level of liquid is at least equal to the level of and contacts said probe.

7. A system as in claim 1, wherein said indicator signal has at least a selected value when the liquid has at least a selected volume, and including manually responsive switch means for generating a control signal, and discriminator circuit means, coupled with said indicator signal and said control signal, for generating an output signal in response to occurrence of said control signal while said indicator signal has at least said selected value.

8. A system as in claim 7, wherein said liquid is in a vessel and a pump is energizable to recirculate the liquid, and including means for energizing and deenergizing the pump, said discriminator circuit means output signal being coupled with said energizing and deenergizing means to operate the same to alternately energize and deenergize the pump in response to successive occurrences of said control signal while said indicator signal has at least said selected value.

9. A system as in claim 7 wherein said manually responsive switch means comprises a conductive probe, third circuit means for sensing a change in capacitance exhibited by said probe upon said probe being closely approached or touched by a user, and fourth circuit means, responsive to said third circuit means sensing at least a selected change in capacitance exhibited by said probe, for generating said control signal.

10. A system as in claim 7, wherein said manually responsive switch means comprises a conductive probe, third circuit means for cyclically charging said probe a predetermined amount and then discharging said probe for a substantially fixed period of time through an impedance, said probe being discharged by substantially a selected amount when it exhibits a nominal capacitance and less than said selected amount when it exhibits a capacitance increased over nominal as may be caused by a user closely approaching or touching said probe, and fourth circuit means for sensing the amount of discharge of said probe and for generating said control signal whenever said probe is discharged at least a predetermined amount less than said selected amount.

11. A system as in claim 10, including feedback means coupled with said third and fourth circuit means and responsive to a sensed amount of discharge of said probe to more or less than said selected amount to control said third circuit means to slowly time delay adjust the value of said impedance to adjust the discharge rate of said probe until said probe is again discharged by substantially said selected amount, whereby said switch means has a substantially constant sensitivity and generates said control signal in response to relatively rapid sensed changes in capacitance exhibited by said probe, but not in response to relatively slow changes as may be caused by naturally occurring environmental conditions.

12. A system for sensing the volume of a conductive liquid having some isolation from ground and a capacitance to ground in accordance with its volume, comprising means coupled with the liquid for sensing the capacitance to ground exhibited by the liquid; and means, coupled with said sensing means, for generating and indicator signal having a value in accordance with the capacitance exhibited by the liquid, and therefore in accordance with the volume of the liquid.

13. A system as in claim 12, wherein the liquid is in a vessel and has a level therein in accordance with its volume, said indicator signal also having a value in accordance with the level of liquid in the vessel.

14. A system as in claim 12, including a conductive probe; means for sensing the capacitance exhibited by said probe, said probe exhibiting a nominal capacitance in the absence of a user and a capacitance which changes by at least a selected amount from nominal upon being closely approached or touched by the user; means coupled with said probe capacitance sensing means for generating a control signal in response to said probe exhibiting a capacitance which is changed by at least said selected amount from nominal; and discriminator circuit means coupled with said indicator and control signals and responsive to occurrence of successive control signals while said indicator signal has at least a selected value to alternately generate at an output therefrom signals having first and second states.

15. A system as in claim 14, wherein a pump is provided for recirculating the liquid in the vessel, including means for coupling said discriminator circuit means output with the pump to respectively energize and deenergize the pump in accordance with said discriminator circuit means output generating signals having said first and second states.

16. A method of sensing the volume of a conductive liquid having some isolation from ground and a capacitance to ground in accordance with its volume, comprising the steps of cyclically charging the liquid a predetermined amount and then discharging the liquid for a substantially fixed period of time through an impedance, the liquid being discharged by an amount in accordance with its capacitance to ground; sensing the amount of discharge of the liquid; and generating an indicator signal having a value in accordance with the sensed amount of discharge of the liquid, and therefore in accordance with the volume of the liquid.

17. A method as in claim 16, wherein said cyclically charging and discharging step comprises cyclically charging the liquid to a predetermined voltage and then discharging the liquid, and said sensing step comprises sensing the voltage to which the liquid is discharged.

18. a method as in claim 17, wherein said sensing step comprises sensing whenever the liquid is discharged to below a threshhold voltage, the extent of discharge being inversely related to the magnitude of the capacitance of the liquid to ground, and said generating step comprises generating the indicator signal having a value in accordance with the sensed duration of discharge of the liquid to below the threshhold level and therefore in accordance with the capacitance exhibited by and the volume of the liquid.

19. A method as in claim 16, including the step of generating an output signal in response to said indicator signal having a value representative of at least a selected minimum volume of liquid.

20. A method as in claim 16, wherein the liquid is in a vessel, and including the step of placing a conductive probe in fixed position above the surface of the liquid in capacitive coupled relationship with the liquid, said cyclically charging and discharging step comprises cyclically charging and discharging the liquid by charging and discharging the probe, and said sensing step comprises sensing the extent to which the probe, and therefore the liquid, is discharged, and said generating step comprises generating an indicator signal in accordance with the sensed discharge of the probe.

21. A method as in claim 20, wherein said generating step comprises generating an indicator signal having at least a predetermined value when the level of liquid is at least equal to the level of and contacts the probe.

22. A method as in claim 16, wherein said generating step comprises generating and indicator signal having at least a selected value when the liquid has at least a sensed selected volume, and including the steps of manually generating a control signal, and detecting occurrence of the control signal while the indicator signal has at least the selected value and generating an output signal in response thereto.

23. A method as in claim 22, wherein the liquid is in a vessel and a pump is energizable to recirculate the liquid in the vessel, and including the step of alternately energizing and deenergizing the pump in response to occurrence of successive output signals.

24. A method as in claim 22, wherein said manually generating step comprises the steps of sensing a change in capacitance exhibited by a conductive probe when the probe is closely approached or touched by a user, and generating said control signal in response to sensing at least a selected change in capacitance exhibited by the probe.

25. A method as in claim 23, wherein said manually generating step comprises the steps of cyclically charging a probe a predetermined amount and then discharging the probe for a substantially fixed period of time through an impedance, the probe being discharged by substantially a selected amount when it exhibits a nominal capacitance and less than the selected amount when it exhibits a capacitance increased over nominal as may be caused by a user closely approaching or touching the probe, and sensing the amount of discharge of the probe and generating the control signal whenever the probe is discharged at least a predetermined amount less than the selected amount.

26. A method as in claim 25, including the steps of detecting discharge of the probe to more or less than the selected amount, and controlling said cyclically charging and discharging step in accordance with the detected discharge of the probe to slowly time delay adjust the value of the impedance to adjust the discharge rate of the probe until the probe is again discharged by substantially the selected amount, whereby the step of generating a control signal generates the control signal in response to relatively rapid changes in capacitance exhibited by the probe, but not in response to relatively slow changes as may be caused by naturally occurring environmental conditions.

27. A method of sensing the volume of a conductive liquid having some isolation from ground and a capacitance to ground in accordance with its volume, comprising the steps of sensing the capacitance to ground exhibited by the liquid; and generating an indicator signal having a value in accordance with the sensed capacitance of the liquid, and therefore in accordance with the volume of the liquid.

28. A method as in claim 27, wherein the liquid is in a vessel and has a level therein in accordance with its volume, so that said generating step generates an indicator signal which also has a value in accordance with the level of the liquid in the vessel.

29. A method as in claim 27, including the steps of sensing the capacitance exhibited by a conductive probe, wherein the probe exhibits a nominal capacitance in the absence of a user and a capacitance which changes by at least a selected amount from nominal upon being closely approached or touched by the user; generating a control signal in response to a sensed probe capacitance which has changed by at least said selected amount from nominal; and alternately generating output signals having first and second states upon successive occurrences of control signals while the indicator signal has at least a selected value.

30. A method as in claim 29, wherein a pump is provided for recirculating the liquid in the vessel, including the step of respectively energizing and deenergizing the pump in accordance with the output signals having first and second states.

31. A capacitance measuring device comprising:
a first circuit means for cyclically charging a capacitor of unknown value a predetermined amount and discharging through an impedance means for a fixed period of time;
a second circuit means for sensing the amount of discharge of said capacitor during said fixed period of time and for generating an output voltage signal having a value in accordance therewith and in accordance with the value of said capacitor.

32. The invention as defined in claim 31 further comprising a third circuit means coupled with the output voltage signal generated by said second circuit means and providing a third circuit output signal having a value representative of said at least a selected minimum level of capacitance evidenced by said capacitor of unknown value.

33. The invention as defined in claim 33 additionally comprising a manually responsive switch means for generating a control signal when said third output voltage signal represents at least said selected minimum level of capacitance.

* * * * *